Dec. 3, 1946.  A. H. SPADER  2,412,068
ROTARY ICE CREAM DISPENSING CABINET
Filed June 13, 1944   2 Sheets-Sheet 1
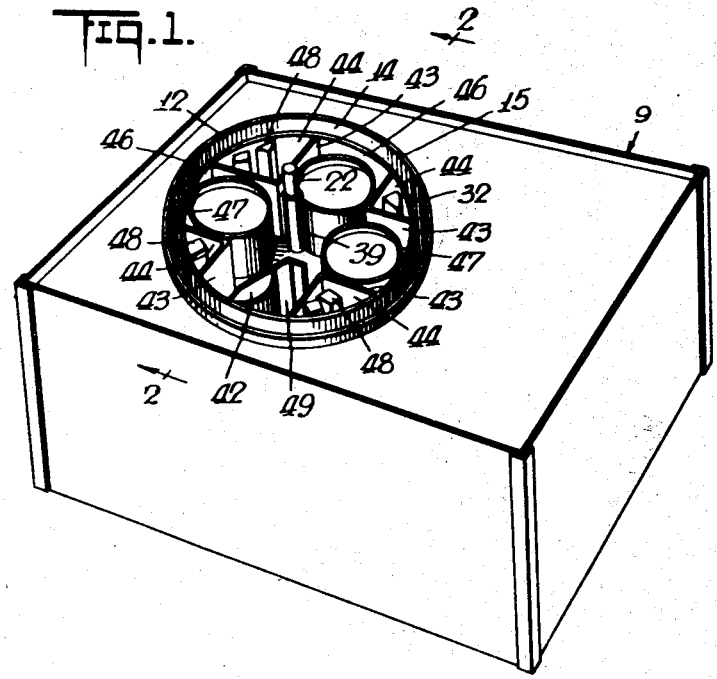
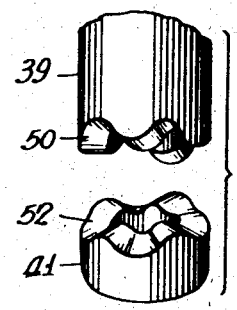
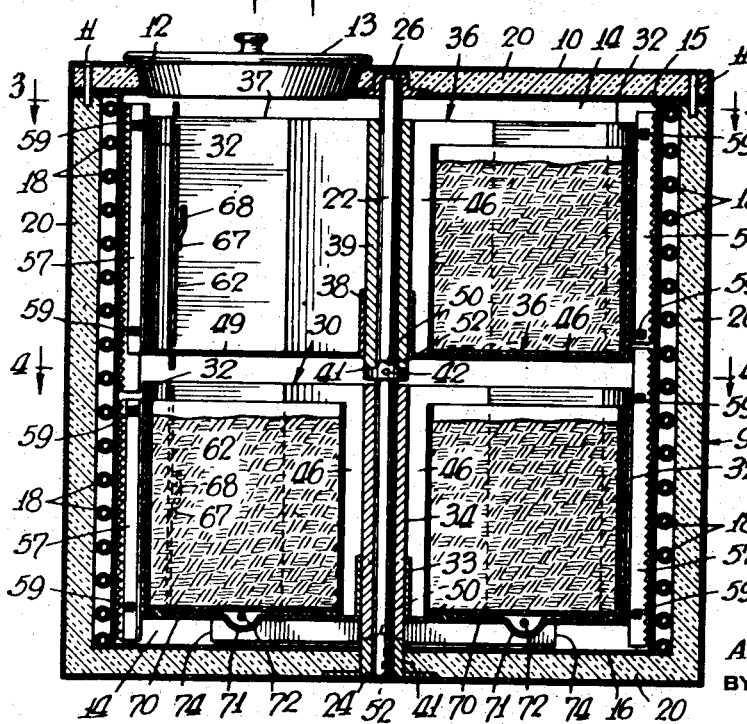
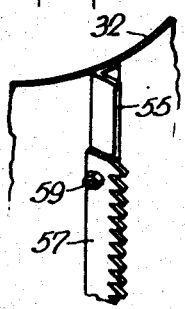
INVENTOR
Arthur H. Spader
BY Richard J. Henoling
ATTORNEY

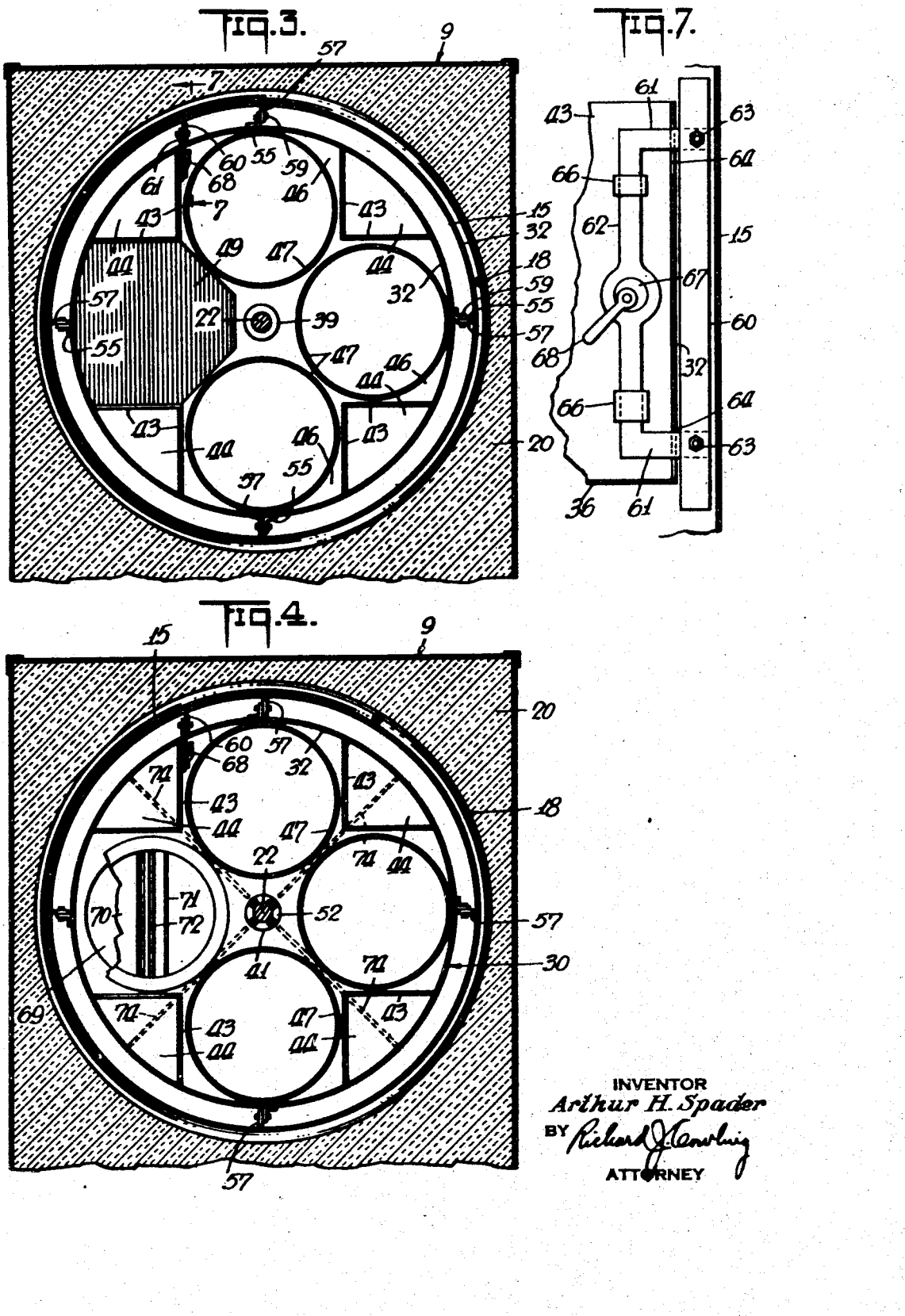

Patented Dec. 3, 1946

2,412,068

UNITED STATES PATENT OFFICE 2,412,068

ROTARY ICE CREAM DISPENSING CABINET

Arthur H. Spader, Bergenfield, N. J.

Application June 13, 1944, Serial No. 540,099

16 Claims. (Cl. 62—89)

The present invention relates generally to refrigerated storage cabinets, and it has particular relation to cabinets of the rotary type which are designed especially for dispensing ice cream, frozen confections, novelties and/or similar products selectively from several compartments thereof to consumers.

One object of the invention is to provide a rotary refrigerated cabinet of a simple construction in which the various compartments are easily accessible for dispensing the products thereof, whereby selective centering means is provided to facilitate vertically aligning such compartments with a single stationary top opening.

Another object of the invention is the provision of suitable means for removing frost from the inner surface of the refrigerated chamber in a simple and efficient manner without requiring the cabinet to be emptied of its contents and defrosted by permitting the temperature to increase to such a degree that the frost will melt away therefrom.

A further object of the invention is to provide suitable means carried by said rotating racks for preventing the formation of frost on the inner surface of the refrigerated chamber to such an extent that the racks cannot be rotated when desired.

Another object of the invention is to provide suitable removable cutting blades on the outside of the racks to cut the frost from the inner surface of the refrigerating chamber as the racks are being rotated while actually being used to dispense their contents.

A further object of the invention is to provide a suitable adjustable scraper blade adapted to be moved into contact with the inner surface of the refrigerating chamber, when desired, and which may be operated simply by revolving the racks therein.

Another object of the invention is the provision of scraping means for removing and collecting frost formations from the bottom surface of the refrigerated chamber whereby it may be readily removed by manual or other suitable means.

Various other and further objects and advantages of the invention, which result in simplicity, economy and efficiency, will be apparent from the following detailed description, wherein a preferred form of embodiment of the invention is shown, reference being had for illustrative purposes to the accompanying drawings, forming a part hereof, in which:

Fig. 1 is a perspective view of a cabinet constructed in accordance with the invention, with its top removed;

Fig. 2 is an elevated sectional view of the apparatus shown in Fig. 1, with its top in position thereon, the same having been taken along the line 2—2 thereof, looking in the direction of the arrows;

Fig. 3 is a cross-sectional view of the apparatus shown in Fig. 2, the same having been taken along the line 3—3 thereof, looking downwardly in the direction of the arrows;

Fig. 4 is another cross-sectional view of the apparatus shown in Fig. 2, the same having been taken along the line 4—4 thereof, looking downwardly in the direction of the arrows;

Fig. 5 is an enlarged fragmentary, separated, perspective view of one form of selective centering means that may be employed in centering the various compartments of the racks in vertical alignment and registry with the single stationary top opening;

Fig. 6 is an enlarged fragmentary perspective view of the fixed vertically mounted removable cutting saws, showing the manner in which they are mounted to the outer sides of the racks; and Fig. 7 is an enlarged perspective view of the radially adjustable vertically mounted scraper blade, showing the cam means by which it is moved into and out of engagement with the inner surface of the refrigerated chamber.

Referring now to the drawings, wherein like figures indicate like parts, and particularly to Fig. 2 thereof, there is shown a refrigerated cabinet comprising an outer casing 9, which may be of any desired shape and size, having a removable top 10 mounted thereon by bolts 11. The top 10 is provided with a relatively small stationary access opening 12, having a suitable removable cover 13 therefor. A circular open-top refrigerating chamber 14 is formed therein by a suitable heat exchange circular baffle plate 15, having an integral bottom plate 16. The circular baffle plate 15 is surrounded by a series of refrigerant evaporator tubes 18 connected to a refrigerating machine, which is not shown since it is of conventional construction and the details thereof form no part of the present invention. The spaces between the evaporator tubes 18 and the sides of the casing 9 are completely filled with a suitable insulating material 20.

While the particular cabinet shown in the drawings has but a single refrigerating unit or chamber 14, it will be apparent that any number of such units may be provided within a single casing, if desired, and that each may be of identical construction and will be operable independently of the other units therein. Also, that the refrigerating machine (not shown) may likewise be positioned within the casing 9, if dimensions permit, or may be positioned and operated from outside of the cabinet, as desired.

A shaft 22 is fixedly mounted centrally or axially of the refrigerated chamber 14 in suitable end brackets 24 and 26 secured in any convenient manner in the bottom and top sides of the casing 9.

A circular lower rack 30, having integral upstanding sidewalls 32 and an integral relatively short tubular axial flange 33, is fixedly secured to a suitable sleeve 34 by welding, shrinking, bolting, etc., which in turn is adapted to be rotatably mounted over the lower portion of the shaft 22 until its lower end rests on the top of the end bracket 24. A similar circular upper rack 36, having integral upstanding sidewalls 32 and an integral relatively short tubular axial flange 38, is likewise fixedly secured to a suitable sleeve 39, which in turn is adapted to be rotatably mounted on the upper portion of the shaft 22. While any suitable means may be provided for rotatably maintaining the upper rack 36 in its proper position on the shaft 22, there is shown by way of illustration a simple way of merely mounting a suitable sleeve bracket 41 fixedly on the shaft 22 at the proper position intermediate its ends by means of a pin 42, which will in turn act as a suitable supporting means for the lower end of the sleeve 39 to which the upper rack has been securely attached.

It will be noted in Fig. 1 that each of the racks 30 and 36 are subdivided into a plurality of compartments, which, in the illustration shown, are designed especially for receiving a plurality of conventional cans of ice cream, frozen confections and novelties. This has been accomplished in the present instance by mounting angular vertical division plates 43 on the base plates of each rack 30 and 36, with their open sides attached to the sidewalls 32 thereof, forming four relatively small substantially triangular pockets 44 equally spaced circumferentially of said racks, thereby providing between adjacent pockets 44 spaces 46 sufficiently large to receive a conventional ice cream can 47. The triangular pockets 44 are especially suitable for holding novelties, cups, frozen confections and the like, which are collectively designated in Fig. 1 by the numeral 48. An opening 49 is provided in the bottom of the upper rack 36 in one of the spaces 46 to provide access to the contents stored in the lower rack 30. This opening 49 is sufficiently large to permit access to the ice cream can 47 stored in the compartment of the lower rack in registry therebelow, and also to the triangular pockets 44 on opposite sides thereof.

Means are provided for selectively aligning the several spaces 46 of the racks 30 and 36 with the opening 12 of the top 10 of the casing 9. Obviously, these means must operate independently of each other so that the lower rack may be rotated while the opening 49 of the upper rack is maintained in vertical alignment with the opening 12 of the casing 9. One simple form of selective centering means is shown by way of illustration, and consists in providing suitable cam conformations 50 on the upper end of the bracket 24 with corresponding cam conformations 52 formed on the lower end of the sleeve 34 adapted to intermesh with said cam conformations 50. In the illustration shown, only four conformations are shown, but obviously as many more may be provided as there are subdivisions in the rack or as may be necessary to align the several subdivisions with the access openings to permit ready access to all compartments. Similar means may be employed for selectively centering the various compartments of the upper rack 36 with the top opening 12. This may be accomplished by providing suitable cam conformations 52 on the upper end of the bracket 41 and corresponding cam conformations 50 on the lower end of the sleeve 39.

A series of angular bars 55 are mounted vertically at spaced intervals circumferentially of the outer surface of the upstanding sidewalls 32 of the racks 30 and 36 by spot welding or other suitable means, as best shown in Fig. 6. Each bar 55 is adapted to carry cutting means in the form of saws 57 attached removably thereto by means of bolts 59. The saws 57 of each rack are of varying lengths, as best shown in Fig. 2, and are so arranged that their adjacent inner ends substantially abut along different horizontal planes so as to completely cover the intervening space between the lower and upper racks 30 and 36, and the teeth of the several saws 57 are positioned on different horizontal planes so as to cut along different horizontal planes as the rack or racks are revolved. The upper and lower ends of the saws 57 extend above and below the racks 30 and 36 substantially to the ends of the chamber 14 to remove frost formations over substantially the entire surface area of the circular plate 15 of the chamber 14.

A second scraping means is also provided on each rack in the form of a radially adjustable vertical knife blade 60 (see Fig. 7). The knife blade 60 is adapted to be moved into actual scraping engagement with the inner surface 15 of the refrigerated chamber 14. The knife blade 60 is mounted removably on the ends of suitable arms 61 of an elongated U-shaped bracket 62 by bolts 63, which arms 61 extend through openings 64 in the sidewalls 32 of the racks 30 and 36 into the spaces between the rotating racks and the inner surface 15 of the refrigerated chamber 14. The large brackets 62 are mounted by means of small sleeve brackets 66 to the sides of one of the angular division plates 43. Eccentric cam means 67, operable manually through fixed handles 68, is employed to move the scraping knife blade 60 into and out of scraping engagement with the inner surface 15 of the refrigerated chamber.

It will be noted in Figs. 2 and 4 that an opening 69 is provided in the bottom of each of the large spaces 46 of the lower rack 30 which is adapted to be closed by a removable cover plate 70 provided with a small semi-circular recess 71 extending diametrically thereacross having a cross bar 72 mounted therein, which serves as a grasping means for the fingers when the plate 70 is to be removed.

A plurality of radial knife scraping blades 74 are fixedly mounted by spot-welding or other suitable means at right angles to each other on the underside of the bottom of the lower rack 30, as best shown in Figs. 2 and 4. The blades 74 are adapted to scrape the surface of the bottom 16 of the refrigerated chamber 14 as the lower rack 30 rotates. In this manner, the frost formations on the bottom plate 16 are being constantly removed, and the frost cuttings (in the form of snow) dropping down from the side surfaces 15 of the chamber 14 are collected by the blades 74. These cuttings may be removed manually from the bottom of the chamber 14 through one of the openings 69 in the bottom of the rack 30 when its cover plate 70 is removed.

In assembling the apparatus, it is assumed that the top 10 of the casing 9 has been removed, and that the various scraping and cutting blades are already mounted on their respective racks 30 and 36. The shaft 22 is first positioned centrally of the refrigerating chamber 14 with its lower end in the recess provided therefor in the bottom supporting bracket 24. The bottom rack 30 is now ready to be positioned on the shaft 22 with its cam conformations 50 intermeshing with the cam conformations 52 on the upper end of the bracket 24. The intermediate supporting bracket 41 should next be positioned on the shaft 22 by means of the pin 42. The upper rack 36 may now be positioned on the shaft 22 with its cam conformations 50 intermeshing with the cam conformations 52 on the upper side of the bracket 41. The top cover 10 may now be replaced on the casing 9 with the recess in the top bracket 26 receiving the free top end of the shaft 22. The top 10 is secured to the casing 9 by any suitable means such as bolts 11. The cover 13, covering the single stationary top opening 12, which has been referred to as being relatively small, is obviously large enough to permit removal of a conventional ice cream can 47 therethrough, and also to permit ready access to the adjacent side novelty compartments 44 when the intermediate space 46 is aligned vertically therewith.

In operation, the cabinet is connected to a suitable refrigerating machine (not shown) to maintain the proper refrigerated temperature in the refrigerating chamber 14. The cover 13 is removed from the opening 12 and the upper rack 36 is moved manually into position so that its bottom opening 49 is vertically aligned therewith. The lower rack is now ready to be filled with merchandise, such as, for example, cans of ice cream 47 being placed in the spaces 46, and novelties, etc., being placed in their respective compartments 44. The upper rack 36, which rotates independently of the lower rack 30, may now be moved manually so that each of its compartments may be aligned respectively with the opening 12 for filling. The cam centering means 50 and 52, being relatively shallow, do not impede rotation of the several racks but merely serve to center each main compartment 46 with the top opening 12. Hand pressure is sufficient to keep the upper rack 36 from rotating and its opening 49 in vertical alignment with the top opening 12 while the lower rack 30 is being rotated.

The inrushing warm air which enters the refrigerating chamber 14 when the cover 13 is removed from the opening 12 carries considerable moisture which has a tendency to condense and form frost on the cold inner surfaces 15 and 16 thereof. These frost formations, while slow in forming, would eventually build up to a depth capable of freezing the racks 30 and 36 to the sides 15 and bottom 16 of the chamber 14 so that they may not be operated until the cabinet is entirely defrosted. These inherent disadvantages are obviated by my invention. The saw blades 57 will cut the frost formations as they build up, and will keep the racks free to rotate in the cabinet. The frost cuttings in the form of snow will gravitate to the bottom 16 of the refrigerating chamber 14, and there will be collected together by the fixed scraping blades 74 as they revolve with the lower rack 30. The blades 74 will also remove and prevent frost formations forming on the bottom 16 of the chamber 14 from building up to a point where they will not permit the lower rack 30 to rotate. These cuttings and scrapings may be manually removed from time to time through the bottom opening 69 of the rack 30 by removing one or more of the cover plates 70 therefrom as they are vertically aligned with the opening 49 of the upper rack 36 and the opening 12 of the cabinet 9.

In addition to the saw cutting blades 57, whose teeth are arranged on different horizontal planes to prevent cutting parallel grooves in the frost formations, I have provided an auxiliary scraping blade 60, which is adapted to be moved into scraping engagement with the surface 15 of the refrigerating chamber 14. When this blade 60 is in scraping engagement with the inner surface 15, it will have a tendency to scrape the last vestige of frost therefrom as the racks are revolved, and, in this way, the cabinet may be operated indefinitely without defrosting in the usual manner by removing the merchandise contents, disconnecting the refrigerating machine, and letting the temperature rise until the frost is melted. Such a practice is laborious, time-consuming, and often difficult to carry out since no auxiliary refrigerating cabinet is available for storing the merchandise while the defrosting operation is being carried out.

With conventional cabinets, it is customary and often necessary to remove the contents and defrost the same about once a week, and more frequently in hot humid weather. With the present invention such time-consuming defrosting operations are entirely dispensed therewith and the cabinet may be operated indefinitely without requiring a complete defrosting and without danger of the rotating racks freezing so tight therein that they cannot be moved. I have found that in a cabinet of approximately the size illustrated herein, having compartments for approximately seven conventional ice cream cans and eight smaller compartments for novelties, the frost cuttings and scrapings will consist of but several handfuls of snow a week, which snow may be removed manually from the bottom of the chamber 14, as previously described. The saws 57 will keep the racks 30 and 36 free to rotate at all times within the cabinet, but since frost acts as insulation and decreases the efficiency of the unit, it is frequently desirable to remove it entirely from the surface 15 of the chamber 14. This may be best accomplished by the blade 60. When both means are employed, the cabinet will operate indefinitely without danger of the racks freezing therein, and with good efficiency. It is quite apparent that only one of the frost removing means may be desirable in some instances. Either means for removing frost from the surfaces of the chamber is sufficient to elimnate the usual weekly defrosting and to keep the racks free for rotation in the cabinet for relatively long periods of time.

Although I have only described in detail several forms of the invention, it will be readily understood by those skilled in the art that the invention is not so limited, but that various modifications may be made therein without departing from the spirit thereof or from the scope of the appended claims.

What I claim is:

1. A cabinet comprising an upright circular refrigerated chamber having a relatively small stationary top opening, a movable cover for said top opening, a shaft mounted axially of said refrigerated chamber, a circular upper rack rotatably mounted on said shaft and subdivided into a plurality of open top compartments at least one of which is also open at its bottom, means carried by said upper rack for removing frost formations from the adjacent inner surface of said refrigerated chamber as the same is being rotated therein, and a circular lower rack rotatably mounted on said shaft and subdivided into a plurality of compartments, means carried by said lower rack for removing frost formations from the adjacent inner surface of said refrigerated chamber as the same is being rotated therein, and a second means mounted on the bottom of said lower rack for removing frost formations from the adjacent bottom surface of said refrigerating chamber as the same is being rotated therein.

2. A cabinet comprising an upright circular refrigerated chamber having a relatively small stationary top opening, a movable cover for said top opening, a shaft mounted axially of said refrigerated chamber, a circular upper rack rotatably mounted on said shaft and subdivided into a plurality of open top compartments at least one of which is also open at its bottom, said upper rack having means for selectively centering its compartments in vertical registry with said stationary top opening, means carried by said upper rack for scraping frost formations from the adjacent inner surface of the refrigerated chamber as the same is rotated therein, a circular lower rack rotatably mounted on said shaft and subdivided into a plurality of compartments, said lower rack having means for selectively centering its compartments in vertical registry with the opening through said upper rack when the latter is in registry with said top opening, and means carried by said lower rack for scraping frost formations from the adjacent inner surface of the refrigerated chamber as the same is rotated therein.

3. A cabinet comprising an upright circular refrigerated chamber having a relatively small stationary top opening, a movable cover for said top opening, a shaft mounted axially of said refrigerated chamber, a circular upper rack rotatably mounted on said shaft and subdivided into a plurality of open top compartments at least one of which is also open at its bottom, said upper rack having means for selectively centering its compartments in vertical registry with said stationary top opening, means including a series of stationary vertically extending blades spaced circumferentially of the outer side of said upper rack for removing portions of the frost formations building up on the adjacent surface of said refrigerated chamber as the same is being rotated therein, a circular lower rack rototably mounted on said shaft and subdivided into a plurality of compartments, said lower rack having means for selectively centering its compartments in vertical registry with the opening through the upper rack when the latter is in registry with said top opening, and means including a series of stationary vertically extending blades spaced circumferentially of the outer side of said lower rack for removing portions of the frost formations building up on the adjacent surface of said refrigerated chamber as the same is being rotated therein.

4. A cabinet comprising an upright circular refrigerated chamber having a relatively small stationary top opening, a movable cover for said top opening, a shaft mounted axially of said refrigerated chamber, a circular upper rack rotatably mounted on said shaft and subdivided into a plurality of open top compartments at least one of which is also open at its bottom, said upper rack having means for selectively centering its compartments in vertical registry with said stationary top opening, means including a series of stationary vertically extending blades spaced circumferentially of the outer side of said upper rack for removing portions of the frost formations building up on the adjacent surface of said refrigerated chamber as the same is being rotated therein, a circular lower rack rotatably mounted on said shaft and subdivided into a plurality of compartments, said lower rack having means for selectively centering its compartments in vertical registry with the opening through the upper rack when the latter is in registry with said top opening, means including a series of stationary vertically extending blades spaced circumferentially of the outer side of said lower rack for removing portions of the frost formations building up on the adjacent surface of said refrigerated chamber as the same is being rotated therein, and a second series of stationary blades radially mounted on the bottom of said lower rack for removing frost formations from the adjacent bottom surface of said refrigerating chamber as the same is being rotated therein.

5. A cabinet comprising an upright circular refrigerated chamber having a relatively small stationary top opening, a movable cover for said top opening, a shaft mounted axially of said refrigerated chamber, a circular upper rack rotatably mounted on said shaft and subdivided into a plurality of open top compartments at least one of which is also open at its bottom, said upper rack having means for selectively centering its compartments in vertical registry with said stationary top opening, means including a series of stationary vertically extending removable blades spaced circumferentially of the outer side of said upper rack for removing portions of the frost formations building up on the adjacent surface of said refrigerated chamber as the same is being rotated therein, a circular lower rack rotatably mounted on said shaft and subdivided into a plurality of compartments, said lower rack having means for selectively centering its compartments in vertical registry with the opening through the upper rack when the latter is in registry with said top opening, and means including a series of stationary vertically extending removable blades spaced circumferentially of the outer side of said lower rack for removing portions of the frost formations building up on the adjacent surface of said refrigerated chamber as the same is being rotated therein.

6. A cabinet comprising an upright circular refrigerated chamber having a relatively small stationary top opening, a movable cover for said top opening, a shaft mounted axially of said refrigerated chamber, a circular upper rack rotatably mounted on said shaft and subdivided into a plurality of open top compartments at least one of which is also open at its bottom, said upper rack having means for selectively centering its compartments in vertical registry with said stationary top opening, means including a series of stationary vertically extending removable blades spaced circumferentially of the outer side of said upper rack for removing portions of the frost formations building up on the adjacent surface of said refrigerated chamber as the same is being rotated therein, a circular lower rack rotatably mounted on said shaft and subdivided into a plurality of compartments, said lower rack having means for selectively centering its compartments in vertical registry with the opening through the upper rack when the latter is in registry with said top opening, means including a series of stationary vertically extending removable blades spaced circumferentially of the outer side of said lower rack for removing portions of the frost formations building up on the adjacent surface of said refrigerated chamber as the same is being rotated therein, and a second series of stationary blades radially mounted on the bottom of said lower rack for removing frost formations from the adjacent bottom surface of said refrigerating chamber as the same is being rotated therein.

7. A cabinet comprising an upright circular refrigerated chamber having a relatively small stationary top opening, a movable cover for said top opening, a shaft mounted axially of said refrigerated chamber, a circular upper rack rotatably mounted on said shaft and subdivided into a plurality of open top compartments at least one of which is also open at its bottom, said upper rack having means including a radially adjustable vertically extending blade for engaging the adjacent inner surface of said refrigerated chamber for scraping the frost formations therefrom as the same is rotated therein, and a circular lower rack rotatably mounted on said shaft and subdivided into a plurality of compartments, said lower rack having means including a radially adjustable vertically extending blade for engaging the adjacent inner surface of said refrigerated chamber for scraping the frost formations therefrom as the same is rotated therein.

8. A cabinet comprising an upright circular refrigerated chamber having a relatively small stationary top opening, a movable cover for said top opening, a shaft mounted axially of said refrigerated chamber, a circular upper rack rotatably mounted on said shaft and subdivided into a plurality of open top compartments at least one of which is also open at its bottom, said upper rack having means including a radially adjustable vertically extending blade for engaging the adjacent inner surface of said refrigerated chamber for scraping frost formations therefrom as the same is rotated therein, a circular lower rack rotatably mounted on said shaft and subdivided into a plurality of compartments, said lower rack having means including a radially adjustable vertically extending blade for engaging the adjacent inner surface of said refrigerated chamber for scraping frost formations therefrom as the same is rotated therein, and a second series including a series of radially mounted horizontally extending blades mounted on the bottom of said lower rack for removing frost formations from the adjacent bottom surface of said refrigerating chamber as the same is being rotated therein.

9. A cabinet comprising an upright circular refrigerated chamber having a relatively small stationary top opening, a movable cover for said top opening, a shaft mounted axially of said refrigerated chamber, a circular upper rack rotatably mounted on said shaft and subdivided into a plurality of open top compartments at least one of which is also open at its bottom, said upper rack having means for selectively centering its compartments in vertical registry with said stationary top opening, means including a series of vertically extending saws spaced circumferentially of the outer side of said upper rack for cutting frost formations building up on the adjacent surface of said refrigerated chamber as the same is being rotated therein, a circular lower rack rotatably mounted on said shaft and subdivided into a plurality of compartments, said lower rack having means for selectively centering its compartments in vertical registry with the opening through the upper rack when the latter is in registry with said top opening, and means including a series of vertically extending saws spaced circumferentially of the outer side of said lower rack for cutting frost formations building up on the adjacent surface of said refrigerated chamber as the same is being rotated therein.

10. A cabinet comprising an upright circular refrigerated chamber having a relatively small stationary top opening, a movable cover for said top opening, a shaft mounted axially of said refrigerated chamber, a circular upper rack rotatably mounted on said shaft and subdivided into a plurality of open top compartments at least one of which is also open at its bottom, said upper rack having means for selectively centering its compartments in vertical registry with said stationary top opening, means including a series of stationary vertically extending saws spaced circumferentially of the outer side of said upper rack for cutting frost formations building up on the adjacent surface of said refrigerated chamber as the same is being rotated therein, a circular lower rack rotatably mounted on said shaft and subdivided into a plurality of compartments, said lower rack having means for selectively centering its compartments in vertical registry with the opening through the upper rack when the latter is in registry with said top opening, means including a series of stationary vertically extending saws spaced circumferentially of the outer side of said lower rack for cutting frost formations building up on the adjacent surface of said refrigerated chamber as the same is being rotated therein, and means including a series of stationary blades radially mounted on the bottom of said lower rack for scraping frost formations from the adjacent bottom surface of said refrigerating chamber as the same is being rotated therein.

11. A cabinet comprising an upright circular refrigerated chamber having a relatively small stationary top opening, a movable cover for said top opening, a shaft mounted axially of said refrigerated chamber, a circular upper rack rotatably mounted on said shaft and subdivided into a plurality of open top compartments at least one of which is also open at its bottom, means carried by said upper rack for removing frost formations from the adjacent inner surface of said refrigerated chamber as the same is being rotated therein, a circular lower rack rotatably mounted on said shaft and subdivided into a plurality of compartments, means carried by said lower rack for removing frost formations from the adjacent inner surface of said refrigerated chamber as the same is being rotated therein, the frost removing means carried by said upper and lower racks being of different lengths and being positioned on said racks in such manner that their abutting ends substantially extend over the space between said racks and meet along different horizontal planes thereby completely covering said space with frost removing means when said racks are being rotated.

12. A cabinet comprising an upright circular refrigerated chamber having a relatively small stationary top opening, a movable cover for said top opening, a shaft mounted axially of said refrigerated chamber, a circular upper rack rotatably mounted on said shaft and subdivided into a plurality of open top compartments at least one of which is also open at its bottom, means including a series of stationary vertically extending saws spaced circumferentially of the outer side of said upper rack for cutting frost formations building up on the adjacent surface of said refrigerated chamber as the same is being rotated therein, a circular lower rack rotatably mounted on said shaft and subdivided into a plurality of compartments, means including a series of stationary vertically extending saws spaced circumferentially of the outer side of said lower rack for cutting frost formations building up on the adjacent surface of said refrigerated chamber as the same is being rotated therein, the saws of each rack being of different lengths and being positioned so that their abutting ends extend over the space between said racks, and being adapted to meet substantially along different horizontal planes thereby completely covering said space with frost removing means when said racks are rotated.

13. A cabinet comprising an upright circular refrigerated chamber having a relatively small stationary top opening, a movable cover for said top opening, a shaft mounted axially of said refrigerated chamber, a circular upper rack rotatably mounted on said shaft and subdivided into a plurality of open top compartments at least one of which is also open at its bottom, means including a series of stationary vertically extending saws spaced circumferentially of the outer side of said upper rack for removing portions of the frost formations building up on the adjacent surface of said refrigerated chamber as the same is being rotated therein, a circular lower rack rotatably mounted on said shaft and subdivided into a plurality of compartments, and means including a series of stationary vertically extending saws spaced circumferentially of the outer side of said lower rack for removing portions of the frost formations building up on the adjacent surface of said refrigerated chamber as the same is being rotated therein, the teeth of diametrically disposed saws of each rack being spaced oppositely so as to cut the frost formations along different horizontal planes as the racks are rotated.

14. A cabinet comprising an upright circular refrigerated chamber having a relatively small stationary top opening, a movable cover for said top opening, a shaft mounted axially of said refrigerated chamber, a circular upper rack rotatably mounted on said shaft and subdivided into a plurality of open top compartments at least one of which is also open at its bottom, means including a series of stationary vertically extending blades spaced circumferentially of the outer side of said upper rack for removing portions of the frost formations building up on the adjacent surface of said refrigerated chamber as the same is being rotated therein, a circular lower rack rotatably mounted on said shaft and subdivided into a plurality of compartments at least one of which is provided with a removable bottom to permit access to the bottom of the refrigerating chamber to remove the frost scrapings therefrom, means including a series of stationary vertically extending blades spaced circumferentially of the outer side of said lower rack for removing portions of the frost formations building up on the adjacent surface of said refrigerated chamber as the same is being rotated therein, and a second series of stationary blades radially mounted on the bottom of said lower rack for removing frost formations from the adjacent bottom surface of said refrigerating chamber as the same is being rotated therein.

15. A cabinet comprising an upright circular refrigerated chamber having a relatively small stationary top opening, a movable cover for said top opening, a shaft mounted axially of said refrigerated chamber, circular upper and lower racks rotatably mounted on said shaft and subdivided into a plurality of open top compartments at least one of which is also open at its bottom, each of said racks having means including a series of stationary vertically extending blades spaced circumferentially of the outer side thereof for removing portions of the frost formations building up on the adjacent surfaces of said refrigerated chamber as the same are rotated therein, and each of said racks also having means including a radially adjustable vertically extending blade adapted to be moved into engagement with the adjacent surfaces of said refrigerated chamber to scrape the frost formations therefrom as the same are rotated in said chamber.

16. A cabinet comprising an upright circular refrigerated chamber having a relatively small stationary top opening, a movable cover for said top opening, a shaft mounted axially of said refrigerated chamber, circular upper and lower racks rotatably mounted on said shaft and subdivided into a plurality of open top compartments at least one of which is also open at its bottom, each of said racks having means including a series of stationary vertically extending blades spaced circumferentially of the outer side thereof for removing portions of the frost formations building up on the adjacent surfaces of said refrigerated chamber as the same are rotated therein, each of said racks also having means including a radially adjustable vertically extending blade adapted to be moved into engagement with the adjacent surfaces of said refrigerated chamber to scrape the frost formations therefrom as the same are rotated in said chamber, and said lower rack also having a series of stationary blades mounted on the bottom thereof for removing and collecting frost from the adjacent bottom surface of said refrigerating chamber as the same is being rotated therein.

ARTHUR H. SPADER.